United States Patent [19]

Mosdale

[11] Patent Number: 6,071,636
[45] Date of Patent: Jun. 6, 2000

[54] FUEL CELL OF THE TYPE WITH PLATE-SHAPED REAGENTS DISTRIBUTORS

[75] Inventor: Renaut Mosdale, Chevreuse, France

[73] Assignees: Automobiles Peugeot, Paris; Automobiles Citrogen, Neuilly sur Seine, both of France

[21] Appl. No.: 09/094,300

[22] Filed: Jun. 9, 1998

[30] Foreign Application Priority Data

Jun. 10, 1997 [FR] France .................................. 97 07188

[51] Int. Cl.⁷ ............................ H01M 2/00; H01M 8/04; H01M 2/08; H01M 8/10
[52] U.S. Cl. ................................ 429/34; 429/17; 429/38; 429/39; 429/30
[58] Field of Search .................... 429/17, 34, 38, 429/39, 30

[56] References Cited

U.S. PATENT DOCUMENTS

| | | | |
|---|---|---|---|
| 3,554,809 | 1/1971 | Craft | 136/86 |
| 5,823,252 | 10/1998 | Waitkat et al. | 165/166 |
| 5,858,569 | 1/1999 | Meacher et al. | 429/26 |

FOREIGN PATENT DOCUMENTS

| | | |
|---|---|---|
| 0 415 733 | 3/1991 | European Pat. Off. . |
| 97 08766 | 3/1997 | WIPO . |
| 97 13287 | 4/1997 | WIPO . |

*Primary Examiner*—Kathryn Gorgos
*Assistant Examiner*—Eana Wong
*Attorney, Agent, or Firm*—Pennie & Edmonds LLP

[57] ABSTRACT

A fuel cell comprising at least one system consisting of anode (1) and of cathode (2) electrodes, an electrolyte (3) located between both electrodes and distributors (10,11) in the shape of plates located on either side of this system in contact with the electrodes for distributing the reagents, discharging the reaction products and collecting the current, the distributors consisting of electrically conducting plates adapted to allow the reagents flowing from one inlet to an outlet to come in contact with the electrodes, wherein each distributor in the shape of plates (10,11) consists of at least one stack of foils of porous material (13) adapted to form an arrangement in which the reactive gas flows in series over the foils.

11 Claims, 1 Drawing Sheet

FUEL CELL OF THE TYPE WITH PLATE-SHAPED REAGENTS DISTRIBUTORS

FIELD OF THE INVENTION

The invention relates to a fuel cell of the type comprising at least one system consisting of anode and cathode electrodes, an electrolyte located between both electrodes and distributors in the shape of plates placed on either side of this system, in contact with the electrodes for distributing the reagents, discharging the reaction products and collecting the current.

BACKGROUND OF THE INVENTION

One already knows fuel cells of this type, in which the distributors consist of electrically conducting plates made for example from graphite and in that face of which, which is in contact with the electrode, are formed channels for the circulation of the gases constituting the reagents.

These distributors exhibit the inconvenience that the channels prevent at their uprightness the electronic contact between the plate and the electrode and that in addition the access of the gases to the electrodes is limited to the open surface of the channels.

One further knows fuel cells in which the distributor plates are made from an electrically conducting porous material. These plates exhibit the advantage of broadening the reaction zone of the electrodes with respect to the plates with channels but exhibit the inconvenience that owing to the diagonally opposite arrangement of the gas inlet and outlet, the mean path of travel of the latter corresponds only to one fraction of the surface of the electrode. As a matter of fact, the distribution by porous materials may be likened to the putting in parallel of a great amount of channels with a very reduced section and low-pressure loss. Due to this fact, the gas behaves like an electronic current and follows the shortest path of travel from the inlet towards the outlet of the reagent while leaving aside substantial portions of the porous material remote from the optimum path of travel.

The object of the present invention is to propose a fuel cell which does not exhibit the inconveniences, which have just been set forth, of the known fuel cells.

To reach this goal, the fuel cell according to the invention is characterized in that each plate consists of a stack of foils of porous material, adapted to be travelled over in series by the reagent gas.

According to one characterizing feature of the invention, the foils are impervious to the reagent gas at those sides which are in contact with other foils and at that face which is not in contact with the electrode.

According to another characterizing feature of the invention, the adjacent foils of porous material are made impervious to the gas at their mutually facing sides by sheets of materials impervious to the gas and interposed between the foils.

The invention will be better understood and further objects, characterizing features, details and advantages thereof will appear more clearly as the following explanatory description proceeds with reference to the accompanying diagrammatic drawings given by way of non limiting example only illustrating one single presently preferred specific embodiment of the invention.

DETAILED DESCRIPTION OF THE INVENTION

Figure 1:
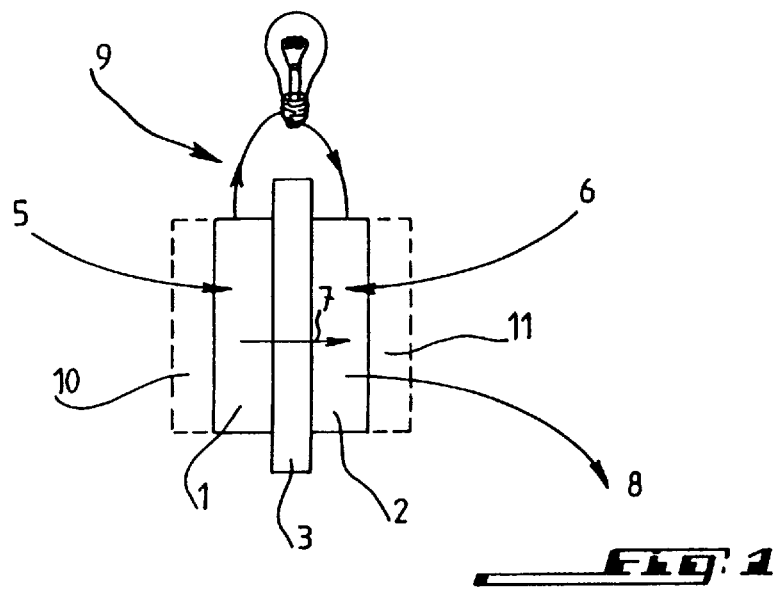
FIG. 1 diagrammatically illustrates the principle of a hydrogen/oxygen fuel cell with a solid electrolyte.

On the schematic diagram of a fuel cell, the reference numerals 1,2 and 3 designate the anode and cathode electrodes, respectively, and, arranged between both of them, a for example solid polymer electrolyte. The arrows 5 and 6 illustrate the conveyance of the reagents, in this case hydrogen and oxygen. Respectively, to the anode and cathode electrodes.

The supply of hydrogen and oxygen to the anode and cathode electrodes causes the following reactions:

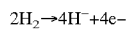

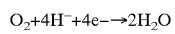

Thus at the anode, the hydrogen is oxidized into protons and produces electrons.

The protons travel through the solid polymer electrolyte which is an electronic insulator and an ionic conductor as shown by the arrow 7 for participating with the electrons coming from the outer electronic circuit in the reduction of the oxygen at the cathode. The arrow 8 symbolizes the water which is produced at the cathode and is discharged from the cell.

Both reactions caused by the supply to the electrodes of both reactive gases bring into the play different phases of reactive species, namely of gaseous, ionic and electronic character. If one of these species is missing in the reaction, the generation of electrons symbolized at 9 stops. The performances of a fuel cell are directly bound to the quality of this threefold gas/ions/electrons contact. This contact is made in the middle of the electrode but will also depend of how the current and the gases are distributed to the electrodes.

Figure 2:
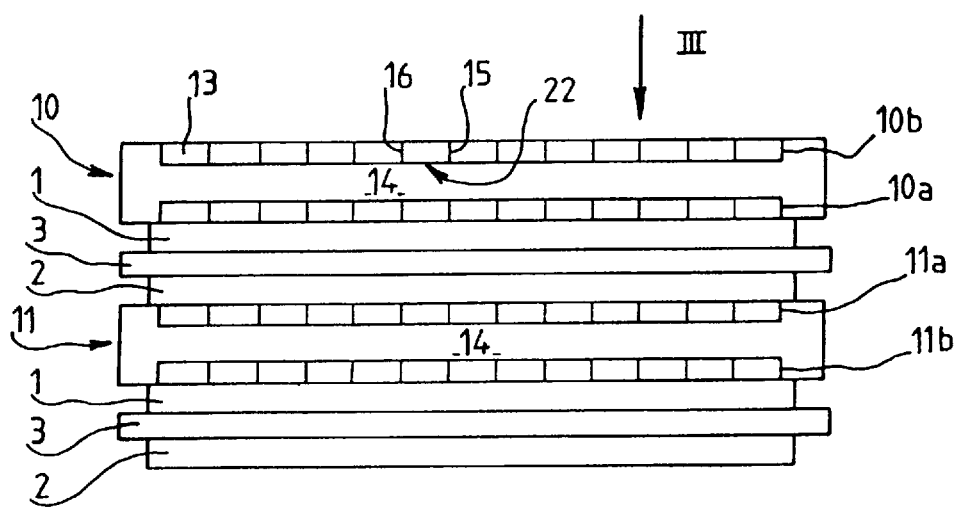

The supply of the reactive gases to the electrodes is accomplished with the assistance of distributors provided in the shape of plates for example of bipolar plates shown at 10 and 11 on FIG. 2. These plates are arranged on either side of the system formed of the electrodes 1,2 and of the electrolyte 3 and shown in FIG. 1.

As shown in FIG. 2, one side of the distributing plate 10, namely the side 10a is in contact with the free face of the anode electrode 1 whereas one side, namely the side 11a is in contact with the free face of the cathode electrode 2. In a cell with several electrodes-electrolyte systems according to FIG. 1, the other sides 10b and 11b of the bipolar plates 10 and 11 are in contact with the electrode 2 and with the anode 1, respectively.

The distributing plates 10 and 11 come into contact with the electrodes for distributing the reagents, discharging the products of the reaction and collecting the current.

According to the present invention, each bipolar distributing plate 10, 11 consists of a stack of fine foils of porous material 13 on either side of a material 14, for example of a sheet impervious to the gas and with a high electronic conduction. This material may be of the metallic or plastic conductor type.

Figure 3:
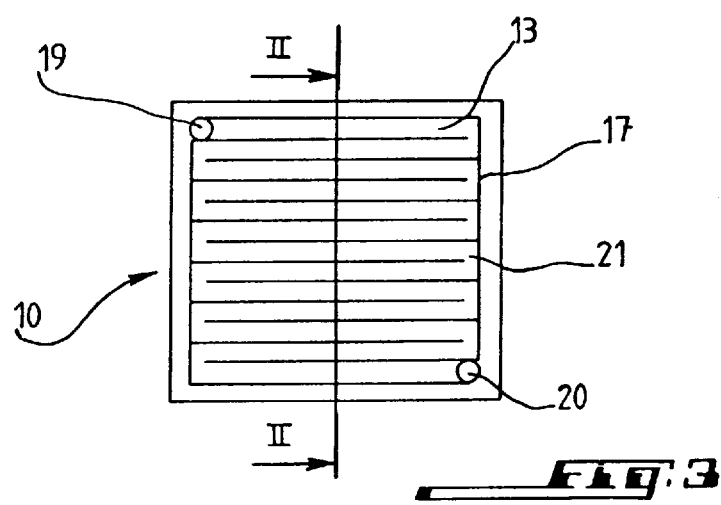
FIG. 2 is a view in section along the line II—II of FIG. 3 of a fuel cell according to the present invention and FIG. 3 is a diagrammatic view in the direction of the arrow III of FIG. 2.

The foils of porous material 13 are made fluid-tight to the gas on three sides, namely the sides 15, 16 and 22 adjacent to the neighbouring foils and to the sides facing away from the electrode. As illustrated in FIG. 3, the foils of porous material 13 are mounted in series in the stack for a reactive gas flowing between the gas inlet 19 and the outlet 20 provided for example at the top and at the bottom of the plate, respectively, at the level of the diagonally opposite corners. The circulation from one foil to another one is provided by a distributor 21 made from plastics material and arranged at the edges of the stack which extend perpendicularly to the foils. To make the foils of porous material impervious to the gas at the sides 15 and 16, it is advantageous to interpose, between two adjacent foils, sheets of materials impervious to the gases.

Owing to the use of plates consisting of the stacking of fine foils of porous material, the invention also provides an advantage from the standpoint of the thermal and hydraulic control of the fuel cell. As shown in FIG. 1, water is produced at the cathode 2 in the cell. The utilization of a porous material according to the invention may permit through a capillary effect to avoid that too much liquid gathers at the level of the electrodes thereby blocking the catalytic sites. In the "conventional" cells with channels, the reactive gases are pre-moistened in humidification units before entering the cell of the fuel cell. These damping units are very detrimental in terms of weight and volume. The utilization of porous material according to the invention permits a suppression or a simplified control of the water in this type of cell and therefore a substantial gain in terms of performances per unit weight or unit volume. As a matter of fact, the electrolyte is moistened by the porous material the porosity of which to water will then be selected in order co absorb enough water for this damping of the electrolyte. For that purpose, the water produced in the cell is returned in part towards the porous material owing to a hydrophobic material.

Another advantage of the invention resides in the fact that the plates may have a lesser thickness with respect to the known plates.

Moreover through the use of an adapted gas flow rate, the water, which exhibits a temperature between 60 and 90°, may be evaporated either in the porous distributors or at the porous material-electrode interface, thus consuming heat and facilitating the cooling of che cell.

The principle of distribution of the reagents according to the invention may be adapted to any type of high-temperature fuel cell, low-temperature fuel cell and mean-temperature fuel cell both for stationary application of delocalized production of electricity and for movable applications such as passenger cars, buses, boats or ships, submarines or other vehicles It should be pointed out that it could be advantageous to use for example in an automotive vehicle air instead of oxygen.

What is claimed is:

1. A fuel cell comprising at least one system including an anode electrode and a cathode electrode, an electrolyte located between both electrodes and a first distributor in the shape of plates placed on each side of the system, in contact with one of the electrodes for distributing a reagent comprising at least one reactive gas, discharging reaction products and collecting an electric current, the first distributor comprising at least one electrically conducting plate having a reagent inlet and a reagent outlet and being adapted to permit reagent flows through said plate between said inlet and said outlet and to allow contact between the reagent and the electrode with which the first distributor is in contact, wherein the first distributor further comprises at least one stack of adjacent foils of porous material adapted to form an arrangement in which the reactive gas flows through the porous material of the foils in series between said inlet and said outlet.

2. A fuel cell according to claim 1, wherein the adjacent foils of porous material are impervious to the at least one reactive gas at those sides which are in contact with other foils and at that face which is not in contact with the electrode.

3. A fuel cell according to claim 1, wherein the flow of the reactive gas from one foil to another one is provided by a second distributor arranged at each end of the stack which extends in perpendicular relation to the foils.

4. A fuel cell according to claim 1, wherein water produced by the cell is returned in part towards the porous material for moistening the electrolyte.

5. A fuel cell according to claim 4, wherein the water is returned by a hydrophobic material.

6. A fuel cell according to claim 1, wherein the porous material has a porosity to water selected in order to absorb enough water for providing damping of the at least one reactive gas.

7. A fuel cell according to claim 1, wherein the flow rate of the at least one reactive gas is adapted to permit the discharge of access water through evaporation.

8. A fuel cell according to claim 1, wherein said stack of foils of porous material comprises a plurality of juxtaposed foils, each having two opposed side faces, and each foil being in contact by at least one of its side faces with an adjacent side face of a juxtaposed foil, so that there is no gap between adjacent foils.

9. A fuel cell comprising at least one system including an anode electrode and a cathode electrode, an electrolyte located between both electrodes and a distributor in the shape of plates placed on each side of the system, in contact with one of the electrodes for distributing a reagent comprising at least one reactive gas, discharging reaction products and collecting an electric current, the distributor comprising at least one electrically conducting plate having a reagent inlet and a reagent outlet and being adapted to permit reagent flows through said plate between said inlet and said outlet and to allow contact between the reagent and the electrode with which the distributor is in contact, wherein the distributor further comprises at least one stack of adjacent foils of porous material adapted to form an arrangement in which the reactive gas flows through the porous material of the foils in series between said inlet and said outlet and is made as a bipolar plate comprising two stacks of foils of porous material located on either side of an electronically conducting material impervious to the at least one gas.

10. A fuel cell according to claim 9, wherein the impervious material is a sheet of an electrically conducting material impervious to the at least one reactive gas.

11. A fuel cell comprising at least one system including an anode electrode and a cathode electrode, an electrolyte located between both electrodes and a distributor in the shape of plates placed on each side of the system, in contact with one of the electrodes for distributing a reagent comprising at least one reactive gas, discharging reaction products and collecting an electric current, the distributor comprising at least one electrically conducting plate having a reagent inlet and a reagent outlet and being adapted to permit reagent flows through said plate between said inlet and said outlet and to allow contact between the reagent and the electrode with which the distributor is in contact, wherein the distributor further comprises at least one stack of adjacent foils of porous material adapted to form an arrangement in which the reactive gas flows through the porous material of the foils in series between said inlet and said outlet, and wherein the adjacent foils of porous material are made impervious to the gas at their mutually confronting sides by sheets of materials impervious to the at least one reactive gas and interposed between the foils.

* * * * *